(12) United States Patent
Easwar

(10) Patent No.: US 6,539,061 B1
(45) Date of Patent: Mar. 25, 2003

(54) EFFICIENT METHOD FOR DECOMPRESSING DIFFERENCE CODED SIGNALS

(75) Inventor: Venkat V. Easwar, Cupertino, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/379,964

(22) Filed: Aug. 24, 1999

Related U.S. Application Data

(60) Provisional application No. 60/100,561, filed on Sep. 16, 1998.

(51) Int. Cl.$^7$ .............................. H04B 1/66; G06F 7/50
(52) U.S. Cl. ........................................ 375/241; 708/709
(58) Field of Search ................................. 375/241, 242; 712/34, 226; 708/505, 518, 603; 382/244, 250; 341/67

(56) References Cited

U.S. PATENT DOCUMENTS

| | | | | | |
|---|---|---|---|---|---|
| 4,369,463 A | * | 1/1983 | Anastassiou et al. | .. | 375/240.05 |
| 5,390,135 A | * | 2/1995 | Lee et al. | .................... | 708/518 |
| 6,128,755 A | * | 10/2000 | Bello et al. | .................. | 714/715 |
| 6,144,321 A | * | 11/2000 | Deygas et al. | ................. | 341/65 |
| 6,219,688 B1 | * | 4/2001 | Guttag et al. | ................ | 708/440 |
| 6,240,437 B1 | * | 5/2001 | Guttag et al. | ................ | 708/209 |

* cited by examiner

*Primary Examiner*—Stephen Chin
*Assistant Examiner*—Lawrence Williams
(74) *Attorney, Agent, or Firm*—Robert D. Marshall, Jr.; W. James Brady, III; Frederick J. Telecky, Jr.

(57) ABSTRACT

A data processing system for the compression and decompression of data using Differential Pulse Code Modulation, and optimized for fast execution using a parallel processing DSP such as the Texas Instruments TMS320C8X family. Decompression is speeded up over the methods known in the art by combining the VLC codes and the additional interval bits into one code, which is then used as an index into a Look Up Table that yields the final result in one step instead of the multiple operations required by current implementations.

4 Claims, 4 Drawing Sheets

| | | | | |
|---|---|---|---|---|
| ROW0 | (p00−m) | (p01−m) | (p02−m) | (p03−m) |
| ROW1 | (p10−p00) | (p11−p01) | (p12−p02) | (p13−p03) |
| ROW2 | (p20−p10) | (p21−p11) | (p22−p12) | (p23−p13) |
| ROW3 | (p30−p20) | (p31−21) | (p32−p22) | (p33−p23) |

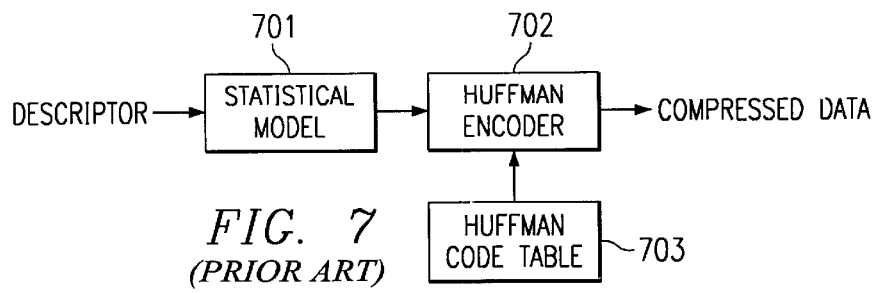
FIG. 7
*(PRIOR ART)*
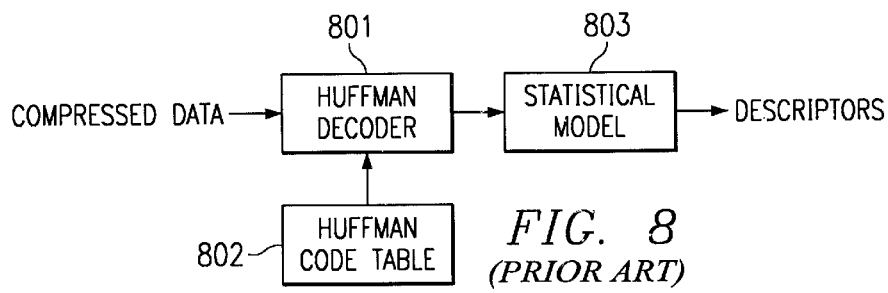
FIG. 8
*(PRIOR ART)*
| 901 | 902 | 903 | 904 | 905 | 906 |
|---|---|---|---|---|---|
| CATEGORY-(SSSS) | CATEGORY VLC | INTERVAL CODED | INTERVAL BITS | COMBINED CODE (xxx..=PLACE HOLDERS FOR INTERVAL BITS) | TOTAL BITS =VLC+ INTERVAL BITS |
| 0 | 1 | 0 | 0 | 1 | 1+0=1 |
| 1 | 01 | [−1,−1], [1,1] | 1 | 01x | 2+1=3 |
| 2 | 001 | [−3,−2], [2,3] | 2 | 001xx | 3+2=5 |
| 3 | 0001 | [−7,−4], [4,7] | 3 | 0001xxx | 4+3=7 |
| 4 | 00001 | [−15,−8], [8,15] | 4 | 00001xxxx | 5+4=9 |
| 5 | 000001 | [−31,−16], [16,31] | 5 | 000001xxxxx | 6+5=11 |
| 6 | 0000001 | [−63,−32], [32,63] | 6 | 0000001xxxxxx | 7+6=13 |
| 7 | 00000001 | [−127,−64], [64,127] | 7 | 00000001xxxxxxx | 8+7=15 |
| 8 | 000000001 | [−255,−127], [127,255] | 8 | 000000001xxxxxxxx | 9+8=17 |
FIG. 9

| CATEGORY-(SSSS) | CATEGORY VLC | INTERVAL CODED | INTERVAL BITS | COMBINED CODE (xxx..=PLACE HOLDERS FOR INTERVAL BITS) | TOTAL BITS =VLC+ INTERVAL BITS |
|---|---|---|---|---|---|
| 8 | 000000001 | −128 | 0 | 000000001 | 9+8=17 |

| | | | | |
|---|---|---|---|---|
| ROW0 | p00 | p01 | p02 | p03 |
| ROW1 | p10 | p11 | p12 | p13 |
| ROW2 | p20 | p21 | p22 | p23 |
| ROW3 | p30 | p31 | p32 | p33 |

| | | | | |
|---|---|---|---|---|
| ROW0 | (p00−m) | (p01−m) | (p02−m) | (p03−m) |
| ROW1 | (p10−p00) | (p11−p01) | (p12−p02) | (p13−p03) |
| ROW2 | (p20−p10) | (p21−p11) | (p22−p12) | (p23−p13) |
| ROW3 | (p30−p20) | (p31−21) | (p32−p22) | (p33−p23) |

EFFICIENT METHOD FOR DECOMPRESSING DIFFERENCE CODED SIGNALS

This application claims priority under 35 USC §119(e)(1) of Provisional Application No. 60/100,561, filed Sep. 16, 1998.

TECHNICAL FIELD OF INVENTION

This invention relates in general to the field of image compression and decompression, and more particularly to a computationally efficient method of decompressing signals that were compressed by using Differential Pulse Code Modulation (DPCM).

BACKGROUND OF THE INVENTION

Differential Pulse Code Modulation is a compression algorithm commonly used in image compression applications. In DPCM, the compressed code words do not represent the actual sample values (as they do in Pulse Code Modulation, or PCM), but the difference between samples. As an example, if we digitize a line of pixels in an image using DPCM, a code word may represent the difference in brightness between the current pixel and it's left neighbor. Since the difference between adjoining images is usually small, the code words that represent small differences occur much more frequently than others. These code words can be made very small, resulting in a high compression rate.

DPCM is a simple example of predictive coding methods, since we attempt to predict the value of a sample using one or more neighboring samples. If the prediction is correct, the result is a very compact code word. The value used to predict the next sample is called the predictor. The predictor for a given sample may be an immediate neighbor, or it may be mathematically derived from more than one neighbor. As an example, the JPEG still picture compression standard uses the following choice of predictors:

No Prediction (PCM)
A
B
C
A+B−C
A+(B−C)/2
B+(A−C)/2
(A+B)/2 where A, B and C are located in the image as follows:

B C
A X and where X is the pixel being predicted. Selection of the best predictor depends on the data being encoded. In the case of simple image encoding the left neighbor pixel may be used with good results.

Differential Pulse Code Modulation may be used in either a lossless or a lossy mode. In the more common lossy mode, the difference values are quantized by division with a constant followed by truncation. This will result in a shorter code word, but at the expense of image quality.

The compression and decompression steps used in DPCM tend to be computationally intensive. When operating in a real-time environment where each image must be decoded in a given time defined by the display or printer requirements, this can present a problem. It is the intent of this invention to show a novel method of decompressing DPCM coded images in real time with a reduced computational requirement.

SUMMARY OF THE INVENTION

The present invention comprises a data processing system designed to compress and decompress data using Differential Pulse Code Modulation. The data to be compressed is coded in two parts, where the first part is the difference magnitude categorized into intervals that may be linear or logarithmic, and Variable Length Codes (VLC) are transmitted for the category with additional bits sent to define the actual value. The method employed for decoding uses the left most bit detection capability of the Texas Instruments TMS320C8X Digital Signal Processor in the preferred embodiment, and Look Up Tables (LUT) are then used to decode the category and the additional difference bits in one step instead of the multiple step decoding process normally used in the art.

BRIEF DESCRIPTION OF THE DRAWINGS

These and other aspects of this invention are illustrated in the drawings, in which:

FIG. 7 is a simplified block diagram of a Huffman entropy encoder;

FIG. 8 is a simplified block diagram of a Huffman entropy decoder;

FIG. 9 is a table showing the combined VLC codes by category;

DETAILED DESCRIPTION OF THE INVENTION

In data compression, the encoder is defined as a unit that generates a sequence of descriptors that are smaller than the original image. The simplest form of encoder would use the actual sample values as the descriptors. This is known as Pulse Code Modulation (PCM). For PCM the set of descriptors is all possible values of the samples. This is the simplest method, and it is also the poorest from the standpoint of compression.

A much better model is realized if we attempt to predict the sample value from one or more samples already coded in the image. As an example, assuming we are coding a line of pixels from the left to the right, we may use the sample to the left as an estimate for the current sample. The descriptor is the difference between the sample being coded and the predictor, or sample to the left. Since in images the differences between one sample and the next are likely to be small, it is more efficient to encode the difference values than to encode each sample independently. This method is known as Differential Pulse Code Modulation, or DPCM. For DPCM, the set of descriptors is all possible difference values.

Figure 1:
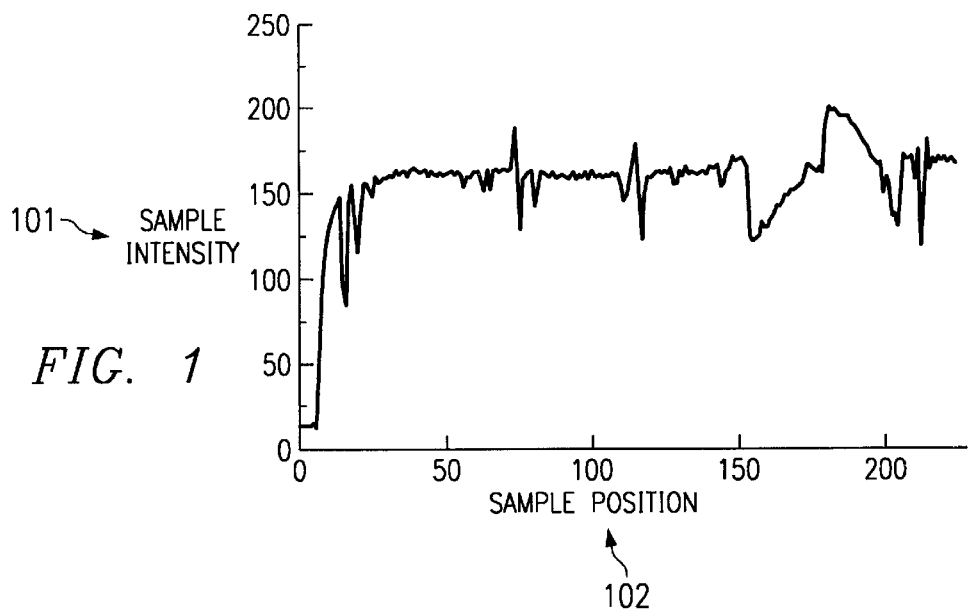
FIG. 1 is a plot of a line of image sample values.
Figure 2:
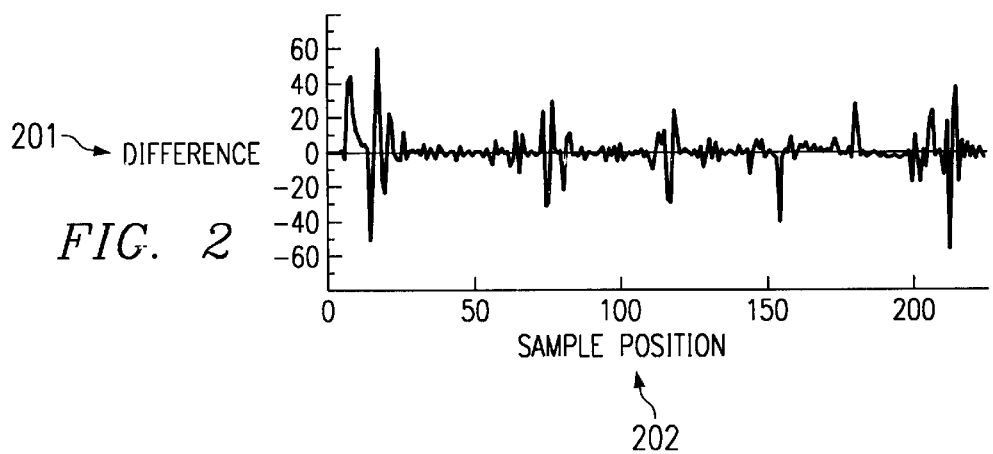
FIG. 2 is a plot of magnitude differences between each sample and the nearest sample to the left.
Figure 3:
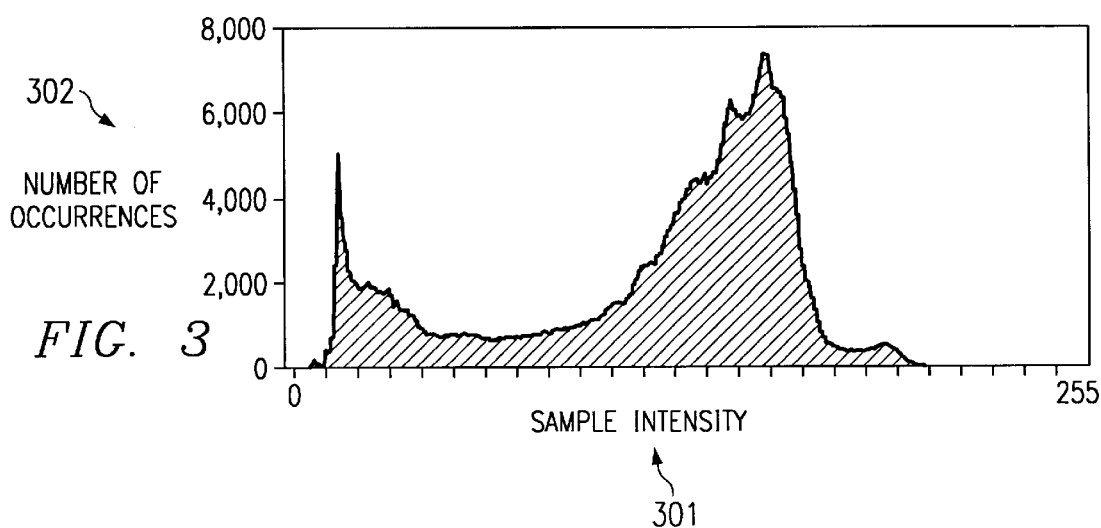
FIG. 3 is a histogram of all the sample values in an image.
Figure 4:
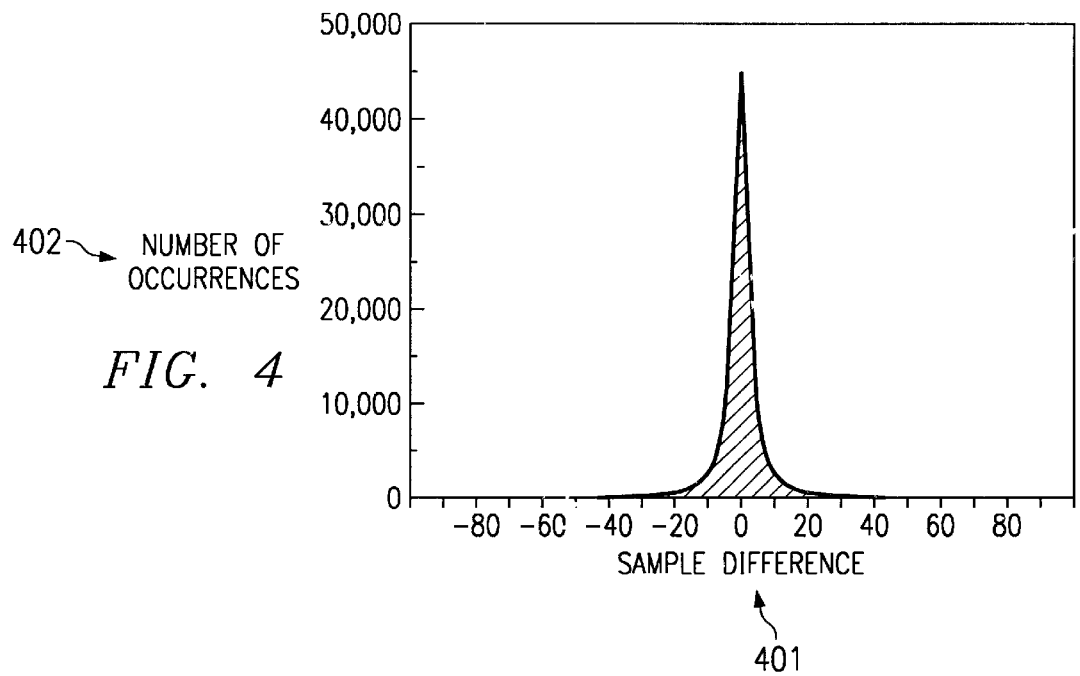
FIG. 4 is a histogram of differences between each sample and nearest neighbor sample to the left in an image.

FIG. 1 shows a plot of samples in a typical line of image data, plotted as sample intensity 101 on the vertical axis and sample position 102 on the horizontal axis of the plot. In FIG. 2 we show the differences between each sample in FIG. 1, and it's immediate neighbor on the left. The differences are plotted on the vertical axis 201, with sample position on the horizontal axis 202. It is obvious from inspecting FIG. 2 that most of the difference values are very close to zero. This can be seen more clearly in FIGS. 3 and 4, where FIG. 3 is a histogram of the intensities for an entire image, with the sample intensity along the horizontal axis 301 and the number of occurrences for each intensity value on the vertical axis 302. In a similar manner, FIG. 4 shows the histogram of the differences between pixels. FIG. 4 is plotted with the horizontal axis 401 representing the difference values and vertical axis 402 the number of occurrences for each difference value. The histogram of differences in FIG. 4 are clustered very tightly around zero, indicating that small differences are very probable.

Given a known starting value, differences from one sample to the next can be used to exactly reconstruct the original sample values. Therefore the set of differences is a representation that is entirely equivalent to the original. The essence of data compression is the assignment of shorter code words to the more probable values, and longer code words to the less probable ones. FIG. 4 demonstrates the high probability of short code words in a typical image, resulting in a high compression ratio as most of the code words can be very small.

Figure 5:
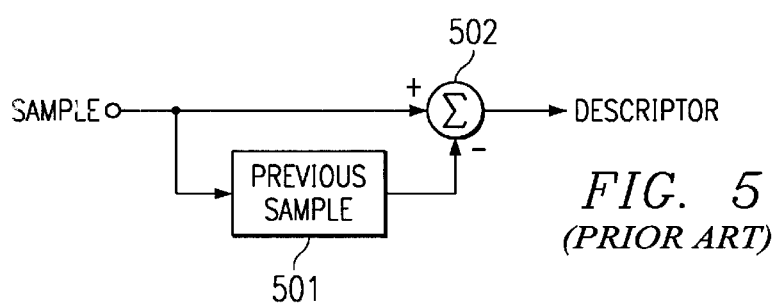
FIG. 5 is a block diagram of Differential Pulse Code Modulation encoder.
Figure 6:
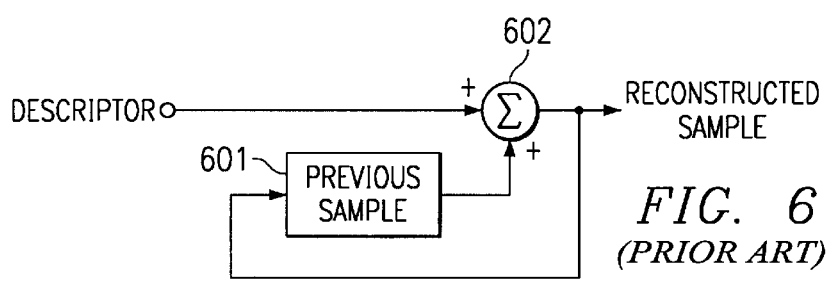
FIG. 6 is a block diagram of a Differential Pulse Code Modulation decoder.

A simple implementation of the DPCM encoding process is shown in FIG. 5, where storage block 501 introduces a one sample delay into the input stream. This delayed sample value is subtracted from the next sample in arithmetic block 502, resulting in the difference value (descriptor) between the pixel being processed and it's left neighbor. The decoding process is similarly shown on FIG. 6, where the left neighbor is stored in block 601, and is then added to the current descriptor in arithmetic block 602 to reconstruct the original sample value.

Once the descriptor is calculated during compression, the next step is entropy coding. Entropy coding is well known in the art, and can be done in a variety of ways, the most common of which is Huffman coding and Arithmetic coding. Huffman coding is simpler and may be implemented with significantly lower computational overhead, and is the algorithm used in the preferred embodiment of the invention. FIG. 7 is a simple representation of an entropy coder, where Statistical Model 701 converts the descriptors into the actual symbols to be coded. As an example, the statistical model may convert 16 contiguous zero values into one symbol indicating a run of 16 zeroes. Block 702 then encodes the symbols into actual VLC (Variable Length Code) codes using the code table stored in block 703. During decoding, the compressed data is decoded into symbols in block 801 of FIG. 8 using the code table stored in 802, and translated back into descriptors in the Statistical Model 804. The code tables used in the encoder and the decoder must be identical.

The Huffman statistical model for coding of DPCM differences segments the difference values into a set of approximately logarithmically increasing magnitude categories. Each of the difference categories is a symbol, and is therefore assigned a Huffman code.

Except for zero differences, the difference category codes do not fully describe the difference. Therefore, immediately following the Huffman code for the non-zero difference categories, SSSS additional bits are appended to the code stream to identify the sign and fully specify the magnitude of the difference. There is one exception to this: SSSS=8 is not followed by any additional bits. If we normalize the image to lie between −128, 127 and use 2's complement arithmetic then there is no need for the additional bits as will be shown in FIG. 9.

The coding table shown in FIG. 9 is optimized for use with a Texas Instruments TMS320C8X Parallel multiprocessor DSP. The TMS320C8X family of processors is particularly well suited for coding of this type, with instructions supporting bit detection logic. In particular, the left most one/left most zero instructions allow easy decoding of the category and VLC codes.

In the usual decoding method known in the art the category code is extracted from the bitstream first, decoded, and then the extra bits defining the difference values are extracted and decoded in a separate step. In the embodiment of this invention the decoding is done in one step by extracting the combined code from the bitstream, and using the combined code as a pointer into a Look Up Table (LUT) to access the difference signal in one step. The size of the LUT is small because of the careful selection of the VLC's chosen. This leads to an efficient implementation where the left most one detection logic of the TMS320C8X Digital Signal Processor is used to determine the size of the next combined code, followed by a LUT operation using the extracted combined code as the pointer.

Column 901 in FIG. 9 contains the Category (SSSS), column 902 is the VLC representing the appropriate category, while in column 903 we show the intervals contained in each category. Column 904 represents the bits required to express the intervals, and column 905 shows the combined code where xxx is used as place holders for the actual interval bits. Column 906 contains the total number of bits required: VLC+Interval Bits.

The process described can also be shown in the following code, written for the TMS320C8X family of multiprocessing DSP's.

```
/*identify the leftmost one using the lmo instruction*/
vlc_length_=lm0(bit_stream)
    /*left_shift amount is the combined code which has a length of 2*vlc_length+1*/
    left_shift=vlc_length<<1+1
    /*find the combined code, lut_index=bit_stream>>(32-left_shift*/
lut_index=bit_stream\\left_shift&%left_shift
    /*adjust bitstream/
bit_stream=bit_stream<<left_shift
    /*find delta using a LUT*/
    delta=*(vlc_lut+lut_index)
    /*store delta*/
    *delta_ptr=delta
```

Figures 10, 11, 12:
FIG. 10 is modification of the table of FIG. 9 for normalized images.
FIG. 11 illustrates a 4×4 block of 16 pixels.
FIG. 12 illustrates differential coding between lines in accordance with this invention.

If the image being compressed is normalized to lie between −128, 127 and we use 2's complement arithmetic the last row in FIG. 9 changes to the row shown in FIG. 10. In this case, for, SSSS=8 we do not need to send a code as shown in column 1001.

The wraparound property of 8-bit 2's complement arithmetic allows large differences to be efficiently coded with smaller codes as the example shows in the following table:

| Signal: −1 | 127 | −128 | 127 | −128 | −28 | −128 | 100 | −120 |
|---|---|---|---|---|---|---|---|---|
| Delta: | 128 | 255 | −255 | 100 | −100 | 228 | −220 | |
| Delta (2's comp.) | −128 | 0 | −1 | 1 | 100 | −100 | 3 | |

If implemented, the above method will further improve compression ratios.

The multiple ALU mode of the TMS320C8X may be used very effectively to speed up the difference calculation during encoding. The image is segmented into 4×4 blocks as shown in FIG. 11 where p00 through p33 represent the 16 pixels of the block. By using the top pixel as the predictor, rows 1–3 can be coded in three cycles as shown in FIG. 12. As illustrated in FIG. 12, the first row may be coded by using the mean m of the previous block as the predictor if the previous line is not available.

The first row may be coded by using the mean m of the previous block as the predictor if the previous line is not available.

Although the present invention has been described in detail, it should be understood that various changes, substitutions and alterations may be made to the embodiments described herein without departing from the spirit and scope of the invention.

What is claimed is:

1. A method of compressing data using Differential Pulse Code Modulation comprising the steps of:

subtracting a data element from a prior data element forming a data difference;

determining the left most zero amount of said data difference;

calculating a left shift amount as twice said left most zero amount plus one;

storing variable length codes and interval bits at corresponding locations within a lookup table;

forming a lookup table index by left shifting said data difference by said left shift amount;

recalling a variable length code and interval bits from said lookup table stored at a location corresponding to said lookup table index; and where the data to be compressed is first normalized to lie within the interval of −128, 127 thus eliminating the need for encoding additional interval bits when the category SSSS=8.

2. A method of compressing data using Differential Pulse Code Modulation comprising the steps of:

subtracting a data element from a prior data element forming a data difference;

determining the left most zero amount of said data difference;

calculating a left shift amount as twice said left most zero amount plus one;

storing variable length codes and interval bits at corresponding locations within a lookup table;

forming a lookup table index by left shifting said data difference by said left shift amount;

recalling a variable length code and interval bits from said lookup table stored at a location corresponding to said lookup table index; and where the difference values are calculated using 8-bit 2's complement arithmetic, and the wraparound properties inherent in 2's complement arithmetic are used to further improve the compression ratio by reducing the size of the difference codes.

3. A method compressing data using Differential Pulse Code Modulation comprising the steps of:

using a processor with multiple Arithmetic Logic Units (ALU);

using the said multiple ALU's to calculate the difference values between samples, on n samples in one operation, where n is the number of parallel ALU's; and where computation is further simplified by using the sample value from the previous line as the predictor instead of the left neighbor sample usually employed for that purpose.

4. The method of claim 3, further comprising:

using a mean value from a previous block for the predictor for a first line.

* * * * *